United States Patent [19]

Myers

[11] Patent Number: 4,475,439
[45] Date of Patent: Oct. 9, 1984

[54] TANDEM BRAKE BOOSTER

[75] Inventor: Lawrence R. Myers, South Bend, Ind.

[73] Assignee: The Bendix Corporation, Southfield, Mich.

[21] Appl. No.: 529,171

[22] Filed: Sep. 2, 1983

[51] Int. Cl.³ ............................ F01B 7/02; F15B 13/14
[52] U.S. Cl. .................................... 91/170 R; 91/434; 91/534; 92/50; 92/64
[58] Field of Search ............ 91/50, 434, 391 A, 391 R, 91/534, 170 R; 92/69 R, 75, 64

[56] References Cited

U.S. PATENT DOCUMENTS

| 787,421 | 4/1905 | Woerner | 92/50 |
|---|---|---|---|
| 2,042,906 | 6/1936 | McElwaine | 92/50 |
| 3,143,929 | 8/1964 | Hager | 92/50 |
| 3,373,662 | 3/1968 | Voll et al. | 92/50 |
| 4,086,842 | 5/1978 | Kytta | 91/391 R |
| 4,387,626 | 6/1983 | Myers | 92/50 |

Primary Examiner—Paul E. Maslousky
Attorney, Agent, or Firm—Leo H. McCormick, Jr.; Ken C. Decker

[57] ABSTRACT

A tandem brake booster (10) having first (24) and second (28) walls that move in opposite directions within a cavity to produce an output force. A lever arrangement (48) attached to the second (28) wall engages a fulcrum (70) to transfer a force produced by movement of the second wall (28) into the first (24) wall. A control mechanism (72) has a cylindrical body (74) with an annular surface (78) that engages the lever arrangement (48). The movement of the cylindrical body (74) as compared to the output member (41) is a function of the ratio of the distance from the fulcrum (70) to end (46) and from the fulcrum (70) to the annular surface (78), and as such, maximum output travel can be achieved without requiring a corresponding input travel.

10 Claims, 1 Drawing Figure

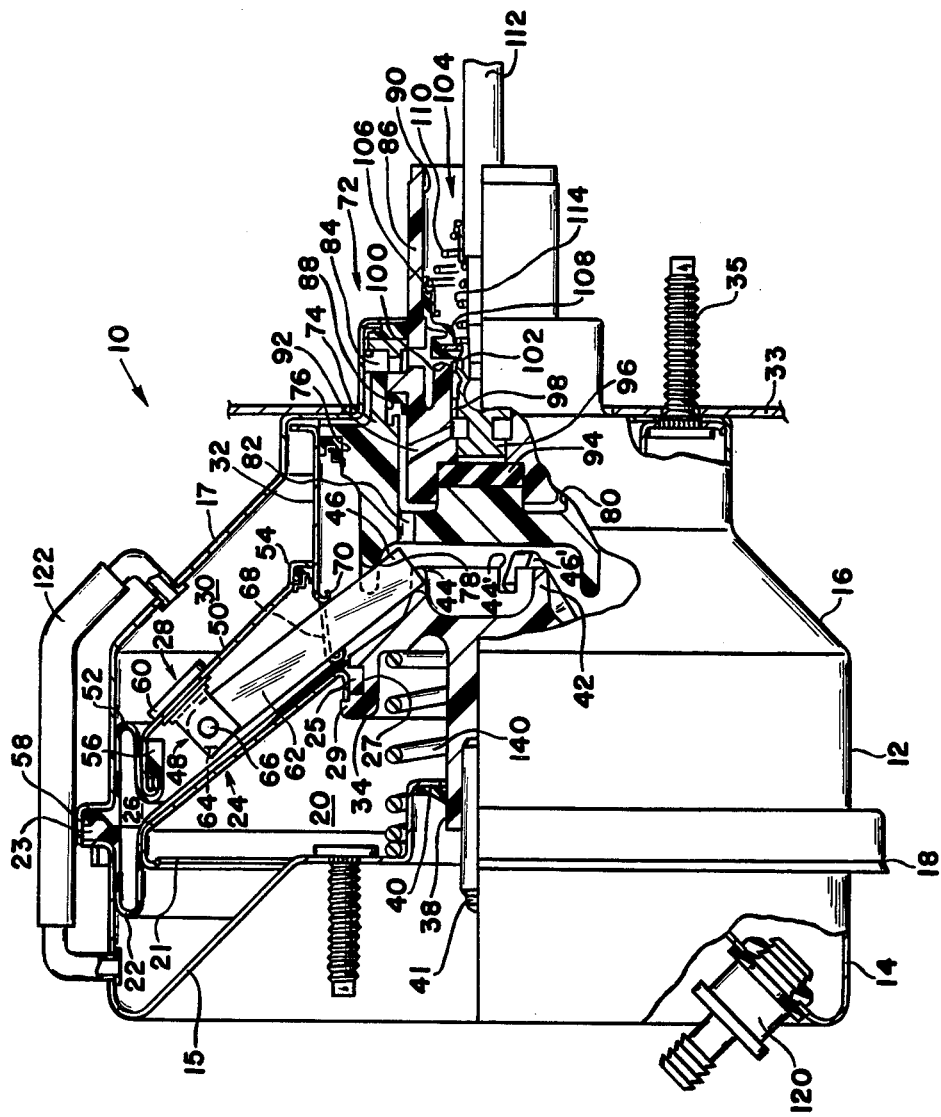

TANDEM BRAKE BOOSTER

This invention relates to a tandem brake booster having a lever arrangement whereby an output force produced by movement of a second wall in one direction is transmitted to a first wall and combined therein with an output force produced by the movement of the first wall in an opposite direction to create an operational force.

This invention is an improvement over U.S. Pat. No. 4,387,626 wherein a tandem brake booster is disclosed which has a lever arrangement through which the force produced by a first wall is combined with the force produced by a second wall moving in an opposite direction. In this brake booster the housing of the input member is part of the first wall. Under some operational conditions, the movement of the output member and correspondingly, the input member, cause an attached brake pedal to travel through an undesirable arc in order to achieve a desired brake force.

SUMMARY OF THE INVENTION

The tandem brake booster disclosed herein has a lever arrangement whereby the travel required by the input member is different than the travel developed in an output member. The output member forms part of a first wall while an input member is connected to the first wall through arms that extend from the second wall into engagement with a fulcrum and the output member. The relative movement of the input member to the output member is a function of the ratio of the distance between the fulcrum and engagement of the output member and fulcrum and engagement of the input member. By selecting the engagement position, the relative travel of the brake pedal can be adjusted to meet operational requirements for many customers.

One advantage of this invention results from the use of independent input and output members through which an input from an operator and output from moveable walls can be selected to produce different degrees of relative motion therebetween.

Another advantage of this invention occurs through the use of the conical-shaped walls that are substantially parallel to the end walls which results in a compact tandem brake booster. The conical-shaped end walls resists axial deflection which can occur when one end of the housing is fixed and the other is free to move during the development of an operational output force.

It is an object of this invention to provide a tandem brake booster having walls that move in opposite directions in response to a pressure differential with a lever arrangement through which the resulting movement is combined and an input member travels a relative lesser linear distance than an output member.

These and other advantageous features of the invention should become apparent from reading this specification while viewing the drawings.

BRIEF DESCRIPTION OF THE DRAWING

The drawing is a sectional view of a tandem brake booster having a lever arrangement made according to the principals of the invention.

DETAILED DESCRIPTION OF THE INVENTION

The tandem brake booster 10 shown in FIG. 1 has a housing 12 made of a front shell 14 and a rear shell 16 joined together by a twist lock connection 18. The front shell 14 has an integral end plate 15 with a conical section which is substantially parallel to integral end plate 17 on rear shell 16. The interior of the housing 12 is divided into a first chamber 20 whose limits are defined by the housing 12 and a first wall 24, a second chamber 26 whose limits are defined by the first wall 24, housing 12 and a second wall 28, and a third chamber 30 whose limits are defined by the second wall 28, housing 12 and a cylindrical projection 32 extending from the rear shell 16. The real shell 16 is fixed to a stationary member 33 of a vehicle by a plurality of bolts 35.

The first wall 24 includes a diaphragm 22, a backing plate 21 and a hub member 34. A first bead 23 on diaphragm 22 is retained by band of the twist lock connection 18 and a second bead 25 which is located in groove 27 on hub member 34 holds backing plate 21 against a shoulder 29. Hub member 34 has a cylindrical projection 38 that extends through an opening 40 in end plate 15. A push rod 41 connects projection 38 with a master cylinder, not shown. Hub member 34 has a central flange 42 with a plurality of slots 44, 44'. . . 44" located therein for receiving ends 46, 46'. . . 46" of lever arrangement 48 which connects the second wall 28 with the first wall 24. The second wall 28 includes a disc member 50, a diaphragm 52, and seal member 54. Diaphragm 52 has a first bead 56 that snaps over the end of disc member 50 and a second bead 58 is held against bead 23 by band of the twist lock connection 18.

Fastener members 60, only one of which is shown, are attached to the disc member 50. Arms 62 of the lever arrangement 48 has one end 64 pivotally attached to fastener member 60 by pins 66.

Projection 32 that extends from end wall 17 of shell 16 has a series of slots 68, only one of which is shown, with a lip 70 located at the bottom of each slot 68. Arms 62 engage lips 70 such that a fulcrum is produced in order to transfer force between the second wall 28 and central flange 42.

A control mechanism 72 has a cylindrical body 74 with a seal 76 that engages projection 32 and an annular surface 78 that engages arms 62 between end 46, 46'. . . 46" and fulcrum lips 70. A bore 80 in the cylindrical body 74 has passages 82 and 84 that connect chamber 30 which chamber 26. A concentric cylindrical member 86 has a seal 88 that engages bore 80 and an opening 85 through which passage 84 is connected with an interior bore 90. Bore 90 is connected to passage 82 by passage 92. A reaction disc 94 is located between the bottom of bore 80 and the end of cylindrical member 86. A plunger 96 located in bore 90 has a series of slots 98 that provide for communication between passage 92 and vacuum seat 100. Plunger 96 has an atmospheric seat 102.

A poppet valve 104 located in bore 90 has a first end 106 secured to cylindrical member 86 and a second end 108 that is free to move within bore 90. A first spring 110 acts on push rod 112 attached to plunger 96 to urge atmospheric seal 102 into engagement with free end 108. A second spring 114 located on piston rod 112 acts on the free end 108 to assist in establishing an atmospheric seal between plunger 96 and poppet valve 104.

MODE OF OPERATION OF THE INVENTION

In an internal combustion engine, vacuum is produced at the intake manifold and as a result such vacuum is used in conjunction with air at atmospheric pressure as a motive force for operating many components of a vehicle. In a vehicle equipped with a tandem brake booster 10 shown in the drawing, vacuum is communciated through check valve 120 into chamber 20. Vacuum in chamber 20 evacuates air from chamber 26 by way of passage 82, bore 90, passage 92, passage 84, chamber 30 and conduit 122.

When an operator desires to effect a brake application, an input force is applied to push rod 112 to move plunger 96 toward disc 94.

Initial movement of push rod 112 activates poppet valve 104 by allowing spring 114 to move free end 108 into engagement with vacuum seat 100 to interrupt vacuum communication to chamber 26. Further movement of push rod 112 moves atmospheric seat 102 on plunger 96 away from free end 108 to allow air to enter chamber 26 by way of bore 90, slots 98, passage 92, bore 80, and passage 82. With air in chamber 26 and vacuum in chambers 20 and 30, a pressure differential is created across walls 24 and 28. This pressure differential acts on wall 24 to produce a first output force that is directly communicated to push rod 41 by way of hub member 34.

Movement of wall 28 which is in the opposite direction of movement of wall 24 causes arms 62 to pivot about fulcrum lip 70 and provide hub member 34 with an additional or additive force to produce the operational force for push rod 41.

The input force applied to push rod 112 to move plunger 96 acts through reaction disc 94 to move cylndrical body 74 toward hub member 34 as wall 24 moves toward chamber 20. The resistance to movement of push rod 41 produces a reaction force that is carried back through annular surface 78 and into disc 94 to balance the input force applied to push rod 112. Since the annular surface 78 engages arm at a position between fulcrum 70 and end 46, the movement of control member 72 as compared with the total movement of push rod 41 is equal to the ratio of the distance between end 46 and fulcrum 70 and between the annular surface 78 and fulcrum 70.

Depending on the desired operational force, with end plate 17 fixed to stationary support, an axial deflection force is produced in the tandem brake booster 10. The conical-shaped end members 15 and 17 tend to resist such axial deflection. In addition, when a maximum operational force is desired, the conical-shaped walls 24 and 28 nestle into the end member 15 and 17 to provide for a most efficient use of space.

On termination of the input force to push rod 112, spring 110 initially moves atmospheric seat 102 into engagement with free end 108 to interrupt communication of air to chamber 26. Further movement of plunger 96 by spring 110 moves free end 108 away from vacuum seat 100. With vacuum seat 100 opened, vacuum in chambers 30 and 20 evacuate air from chamber 26. As the pressure differential across walls 24 and 28 equalizes, spring 140 acts on hub member 34 to move wall 24 toward end plate 17. At the same time, a force acting on end 46 of lever 62 moves wall 28 toward end plate 15. When the fluid pressure in chambers 20, 26, and 30 equalizes, cylindrical member 74 engages end plate 17 to limit the movement of walls 24 and 28 toward each other to produce a rest position as shown in the drawing.

In the absence of vacuum in chambers 20 and 30, an operator must manually provide an input to push rod 41.

The input applied to push rod 112 moves plunger 96 into engagement with disc 94 to provide cylindrical member 74 with linear movement. Annular surface 78 acts on lever arm 62 to transmit the linear movement to hub member 34. As hub member 34 moves toward end plate 15, lever arms 62 pivot about pin 66 since wall 28 remains stationary. Slots 68 in projection 32 are such that when hub member 34 reaches its maximum stroke, lever arms 62 are still retained in slots 68. On termination of the manual input, return spring 140 returns the wall 24 to the position illustrated in the drawing.

I claim:

1. In a tandem brake booster having a housing wherein first and second walls move in opposite directions within a cavity therein to produce first and second output forces in response to an input force applied to a control member and a lever arrangement through which said second output force is presented to an output member and combined therein with said first output force to create a joint output force, said lever arrangement being characterized by arm means having a first end connected to said second wall, a fulcrum, and a second end connected to said output member, said control member engaging said arm means between said second end and fulcrum, said arm means pivoting about said fulcrum to provide said output member and control member with different inputs to correspondingly reduce the relative travel of said control member with respect to said output member.

2. The tandem brake booster as recited in claim 1 wherein said control member is characterized by a first member having an annular surface that engages said arm means to receive one of said different inputs and balance the input force applied to said control member.

3. The tandem brake booster, as recited in claim 2, wherein said fulcrum is characterized by slot means that receives and guides said arm means to prevent said second wall from moving out of contact with said fulcrum on manual movement of said arm means by said control member.

4. The tandem brake booster as recited in claim 3 wherein said first and second walls are characterized by substantially parallel conical surfaces that are substantially parallel to the housing of said tandem booster.

5. The tandem brake booster, as recited in claim 3, wherein the resistance to movement of said output member produces a reaction force that is carried back through said arm means to said control member to achieve said balance with said input force.

6. In the tandem brake booster, as recited in claim 5, wherein said booster further includes:
   a return spring located in said first chamber for urging said first and second walls toward said other of the conical end members.

7. A tandem brake booster comprising:
   a housing having a cylindrical section with substantially parallel conical end members, said housing having a cavity therein;
   a first wall located in said cavity to define a first chamber between one of said conical end members and said first wall, said first wall being substantially parallel to said conical end members;
   a second wall located in said cavity to define a second chamber between the other of said conical end members and said second wall, said second wall being substantially parallel to said conical end members, said first and second walls and said cylindrical section of said housing defining a third chamber, said first chamber being connected to said second and third chambers to allow a first fluid communicated to said first chamber to be communicated thereto;

an output member secured to said first wall and extending through the one of said end members;

lever means having a first end connected to said second wall and a second end connected to said output member;

a fulcrum attached to the other of said conical end members and in contact with said lever means;

a control member having a body with an annular surface that engages said lever means between said fulcrum and second end, said body having passages therethrough for connecting said second and third chambers to each other and said second chamber with a second fluid, said control member having a valve responsive to an input force for interrupting fluid communication between said second and third chambers and allowing communication of said second fluid to said third chamber, said first fluid in said first and third chambers and said second fluid in said third chamber creating a pressure differential across said first and second walls, said pressure differential moving said first wall toward said first chamber to produce a first output force that is transmitted to said output member and said second wall toward said second chamber to produce a second output force, said lever means pivoting on said fulcrum to transfer said second output force to said output member to produce a combined operational output force, said annular surface transferring a reaction force from said lever means to said valve to balance said input force and control the movement of said body toward said first chamber.

8. In the tandem brake booster as recited in claim 7 wherein said control member further includes:
a cylindrical disc retained in the body between said annular surface and valve, said input force being communicated through said disc to move said body as said first wall moves toward said first chamber.

9. In the tandem brake booster as recited in claim 8 wherein said control member and said output member move at different linear rates as a function of the distances between said fulcrum and positional engagement of the output member and between said fulcrum and positional engagement of said annular surface.

10. In the tandem brake booster as recited in claim 7 wherein said conical end members resist axial deformation created during the development of said operational output force when said other of the end members held in a stationary position.

* * * * *